(12) United States Patent
Quinn et al.

(10) Patent No.: US 9,385,950 B2
(45) Date of Patent: Jul. 5, 2016

(54) CONFIGURABLE SERVICE PROXY LOCAL IDENTIFIER MAPPING

(71) Applicant: Cisco Technology, Inc., San Jose, CA (US)

(72) Inventors: Paul Quinn, San Francisco, CA (US); James Guichard, New Boston, NH (US); Surendra Kumar, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 14/052,968

(22) Filed: Oct. 14, 2013

(65) Prior Publication Data

US 2015/0103827 A1    Apr. 16, 2015

(51) Int. Cl.
| | |
|---|---|
| H04L 12/28 | (2006.01) |
| H04L 12/741 | (2013.01) |
| H04L 12/931 | (2013.01) |
| H04L 29/08 | (2006.01) |

(52) U.S. Cl.
CPC .............. *H04L 45/74* (2013.01); *H04L 49/354* (2013.01); *H04L 49/70* (2013.01); *H04L 67/327* (2013.01)

(58) Field of Classification Search
CPC .......................... H04L 67/327; H04L 67/2814
See application file for complete search history.

(56) References Cited

U.S. PATENT DOCUMENTS

| | | | |
|---|---|---|---|
| 7,558,261 B2 | 7/2009 | Arregoces et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 8,311,045 B2 | 11/2012 | Quinn et al. | |
| 8,442,043 B2 | 5/2013 | Sharma et al. | |
| 8,619,773 B2 * | 12/2013 | Filsfils et al. | 370/389 |
| 2005/0289244 A1 * | 12/2005 | Sahu et al. | 709/249 |
| 2006/0092950 A1 | 5/2006 | Arregoces et al. | |
| 2006/0095960 A1 | 5/2006 | Arregoces et al. | |
| 2007/0153807 A1 * | 7/2007 | Cruz et al. | 370/395.52 |
| 2008/0177896 A1 | 7/2008 | Quinn et al. | |
| 2010/0165985 A1 | 7/2010 | Sharma et al. | |
| 2011/0023090 A1 * | 1/2011 | Asati et al. | 726/4 |
| 2014/0307744 A1 * | 10/2014 | Dunbar | H04L 45/44 370/401 |
| 2014/0362857 A1 * | 12/2014 | Guichard et al. | 370/392 |
| 2015/0156035 A1 * | 6/2015 | Foo | H04L 47/2441 370/392 |

OTHER PUBLICATIONS

Rosen, et al., "BGP/MPLS IP Virtual Private Networks (VPNs)," Network Working Group, RFC 4364, Feb. 2006, pp. 1-47.
International Search Report and Written Opinion in counterpart International Application No. PCT/US2014/059011, mailed Jan. 29, 2015, 10 pages.
Quinn et al., "Network Service Header—draft-quinn-sfc-nsh-03.txt", Internet Engineering Task Force, Standard Working Draft, Internet Society, Jul. 3, 2014, 27 pages.

* cited by examiner

*Primary Examiner* — Maharishi Khirodhar
(74) *Attorney, Agent, or Firm* — Edell, Shapiro & Finnan, LLC (57) ABSTRACT

Presented herein are techniques in which a service proxy in a service node is configured to receive a packet encapsulated in a service header that includes a variable set of context headers. The service proxy is configured to use the context headers in the service header to map data in the packet to a local identifier that is associated with one of a plurality of service-functions hosted by the service node. The service proxy is further configured to forward the data in the packet to the service-function associated with the local identifier.

22 Claims, 7 Drawing Sheets

| PATH-ID | CONTEXT 1 | CONTEXT 2 | VLAN FOR FORWARDING |
|---|---|---|---|
| PATH-ID$^{10}$ | CLIENT A | WEB | VLAN$^1$ |
| PATH-ID$^{10}$ | CLIENT A | DATABASE | VLAN$^2$ |
| PATH-ID$^{20}$ | CLIENT B | DATABASE | VLAN$^3$ |

CONFIGURABLE SERVICE PROXY LOCAL IDENTIFIER MAPPING

TECHNICAL FIELD

The present disclosure relates to networking for service chains/service paths.

BACKGROUND

Network services are widely deployed and useful in many networks. The services provide a range of functions such as security, wide area network (WAN) acceleration, firewall, and server load balancing. Service functions that form part of the overall service may be physically located at different points in the network infrastructure, such as the WAN, data center, campus, and so forth.

Current network service deployment models are relatively static, and are bound to topology for insertion and policy selection. Furthermore, they do not adapt well to elastic service environments enabled by virtualization.

New data center network and cloud architectures require more flexible network service deployment models. Additionally, the transition to virtual platforms requires an agile service insertion model that supports elastic service delivery. The movement of service functions and application workloads in the network and the ability to easily bind service policy to granular information such as per-subscriber state are particularly useful.

DESCRIPTION OF EXAMPLE EMBODIMENTS

Overview

Presented herein are techniques in which a service proxy in a service node is configured to receive a packet encapsulated in a service header that includes a variable set of context headers. The service proxy is configured to use the context headers in the service header to map data in the packet to a local identifier that is associated with one of a plurality of service-functions hosted by the service node. The service proxy is further configured to forward the data in the packet to the service-function associated with the local identifier.

Example Embodiments

A "service chain" is a data structure defining a set of service-functions (services) and the order in which the service-functions should be applied to the data/payload (e.g., video data, numeric data, alphanumeric data, voice data, etc.) of selective traffic (packets/frames). The service-functions may include, for example, services such as firewall, load balancing, network address translation (NAT), deep packet inspection (DPI), intrusion detection service (IDS), etc. and are executed at network nodes referred to herein as service nodes.

Service chaining primarily involves the interception of traffic and steering the traffic through the service chain (i.e., the ordered set of service functions). The traffic is intercepted through the use of a classifier function at a network node that serves as a head-end node to the service chain. The network node that executes the classifier function is sometimes referred to herein as a "classifier." In general, the traffic is steered from the classifier through the service-functions using one or more Layer 2 (L2)/Layer 3 (L3) service overlays in the network. In other words, a service header is appended to the traffic for routing through the service chain and the service header enables the carrying of service metadata in addition to the original data/payload.

A service header is part of the data-plane of a service chain and includes metadata specifically formatted for consumption by a service-function. The metadata may include, for example, an application identifier (ID), flow or path ID, and client or user ID, network classification used for deriving targeted service policies and profiles, common metadata related to a particular service such as finer classification that can be passed to the service functions further down the service-path. In other words, service-functions benefit from metadata derived both from the network as well as the service-functions that form a given service chain. Metadata can also be passed between network nodes and be used, for example, to determine forwarding state at the end of a service chain.

The metadata carried within a service header may be a combination of the metadata pushed by a central controller and metadata determined by the head-end network node (e.g., the classifier). Controllers push network classification specific metadata to all the network nodes that act as classifiers. These network nodes perform the classification and choose the assigned metadata for that classification along with the forwarding state. The determined metadata could be related to aspects of the service topology such as tenant identity. The implication of associating such metadata to the forwarding state and passing it to the functions that provide services is that more complex services can be delivered, for instance, on a tenant boundary for a given service-path. This can result in simpler services because the services do not need to derive information or re-classify every packet/flow.

Figure 1:
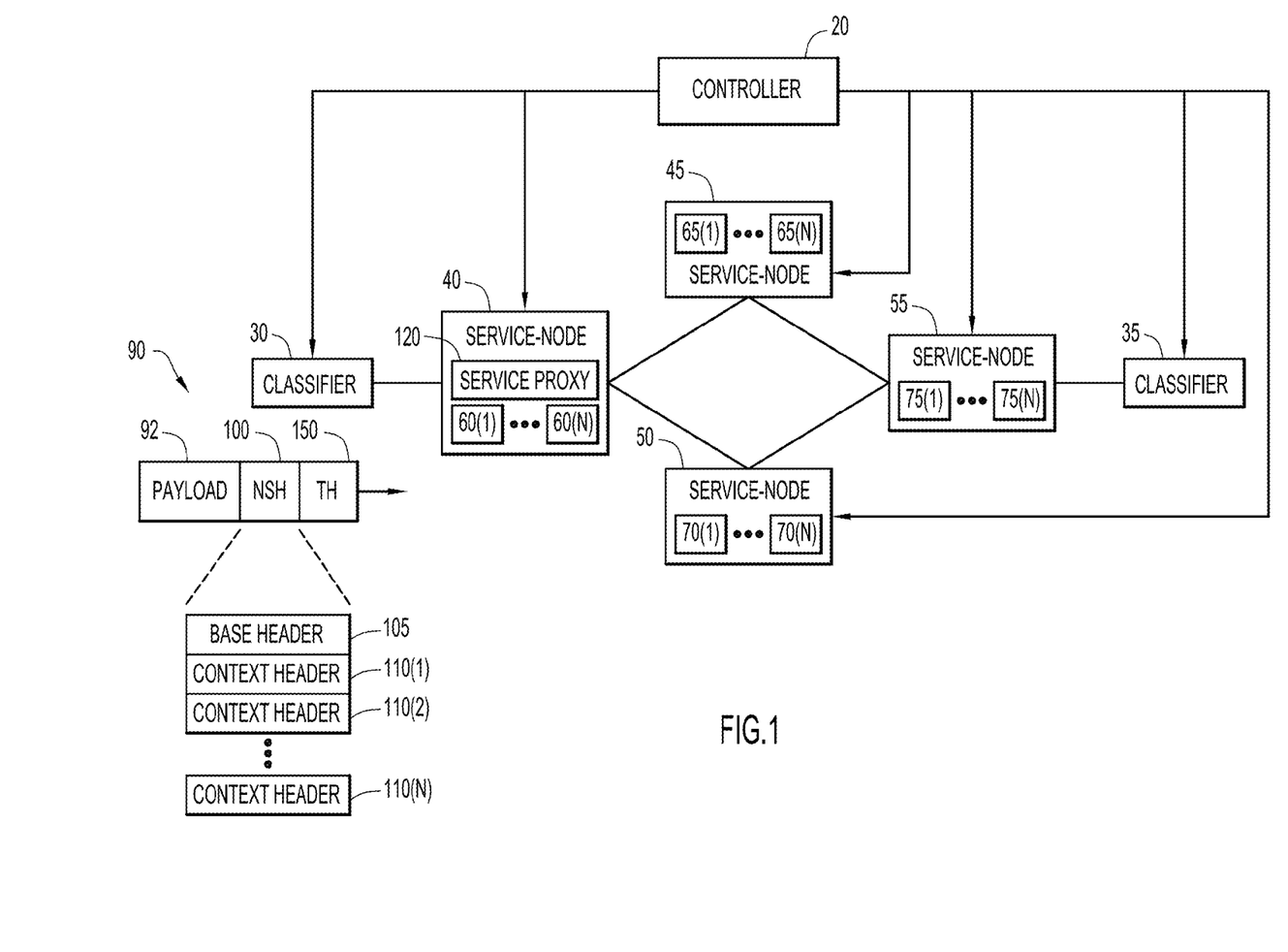
FIG. 1 is a block diagram of an example arrangement of a network that includes one or more service nodes having a configurable service proxy in accordance with examples presented herein.

Reference is now made to FIG. 1 for a description of an example network environment 10 in which the techniques presented herein may be employed. In the example of FIG. 1, there is a controller 20 that is in communication with classifier network nodes 30 and 35 and with a plurality of service nodes 40, 45, 50 and 55. The service nodes 40, 45, 50 and 55 are also sometimes referred to herein as network nodes and the classifier nodes 30 and 35 are also sometimes referred to herein as head-end nodes.

The service nodes 40, 45, 50, and 55 each host/support one or more service-functions (services) for application to data in packets passing through the respective service node. More specifically, in the example of FIG. 1, service node 40 supports service-functions 60(1)-60(N), service node 45 supports service-functions 65(1)-65(N), service node 50 supports service-functions 70(1)-70(N), and service node 55 supports service-functions 75(1)-75(N). Some of the service-functions hosted by the service nodes 40, 45, 50, and 55 may be the same in the example of FIG. 1. In other words, in the example scenario of FIG. 1, service-functions may appear in multiple instances on different service nodes or on the same service node.

FIG. 1 also shows an example of a packet 90 that passes through the head-end node 30. The packet 90 includes payload 92 that is encapsulated in a service header 100 and then encapsulated within a transport header (TH) 150. As noted, a service header, such as service header 100, is metadata added to a packet or frame that is used to create a service plane. The payload 92 and the service header 100 are then encapsulated in the outer TH 150 for transport through the service chain. The service header 100 may be added by a service classification function, i.e., the head-node 30 (in the form of a device or application), that determines which packets require servicing, and correspondingly which service path to follow to apply the appropriate service.

For ease of illustration, examples presented herein will be primarily described with reference to one specific type of service header, referred to as the Network Service Header (NSH) 100. It will be appreciated that the examples presented herein may be used with other types of service headers.

The Network Service Header

In general, the NSH 100 comprises a plurality of headers that include service related information. The NSH 100 is designed to be easy to implement across a range of devices, both physical and virtual, including hardware forwarding elements. The NSH 100 addresses several limitations associated with network service deployment today.

Topological Dependencies: network service deployments are often coupled to the physical network topology creating artificial constraints on delivery. These topologies serve only to "insert" the service function; they are not required from a native packet delivery perspective. For example, firewalls often require an "in" and "out" layer-2 segment and adding a new firewall requires changing the topology i.e. adding new layer-2 segments. This is restrictive because as more services are required—often with strict ordering—topology changes are needed before and after each service resulting in complex network changes and device configuration. In such topologies, all traffic, whether a service needs to be applied or not, will often pass through the same strict order. A common example is web servers using a server load balancer as the default gateway. When the web service responds to non-load balanced traffic (e.g. administrative or backup operations), all traffic from the server must traverse the load balancer forcing network administrators to create complex routing schemes or create additional interfaces to provide an alternate topology.

Service Chaining: service functions are most typically independent, e.g. service-functions 60(1)-60(N) and service-functions 65(1)-65(N) are unrelated and there is no notion at the service layer that service-functions 60(1)-60(N) occur before service-functions 65(1)-65(N). However, to an administrator many service functions have a strict ordering that must be in place yet there is no consistent way to impose and verify the deployed service ordering.

Service Policy Application: service functions rely on either topology information such as virtual local area networks (VLANs) or packet (re)classification to determine service policy selection, the service action taken. Topology information is increasingly less viable due to scaling, tenancy, and complexity reasons. Per-service function packet classification is inefficient and prone to errors, duplicating functionality across services. Furthermore, packet classification is often too coarse lacking the ability to determine class of traffic with enough detail.

Elastic Service Delivery: given the current state of the art for adding/removing services largely centers around VLANs and routing changes, rapid changes to the service layer can be difficult to realize due to the risk and complexity of such changes.

Common Header Format: various proprietary methods are used to share metadata and create service paths. An open header provides a common format for all network and service devices.

Transport Agnostic: services can and will be deployed in networks with a range of transports, including underlays and overlays. The coupling of services to topology requires services to support many transports or for a transport gateway function to be present.

As shown in FIG. 1, the NSH 100 consist of a base header 105 and a plurality of context headers 110(1)-110(N). The base header 105 may be composed of two words, but for simplicity it is shown as a single element in FIG. 1. The base header 105 provides information about the NSH 100 and service path identification.

More specifically, the base header 105 includes a flags field, a protocol type field, a service index field, and a service path identifier (ID) field. The flags field includes an "O" bit and a "C" bit. The "O" bit is a one-bit flag that indicates whether a packet is an operations and management (OAM) packet. Service nodes examine the payload and take appropriate action (i.e. return status information) when the "O" bit is set. The "C" bit indicates whether context headers are present. When the "C" bit is set, one or more contexts are in use (i.e. a value placed in a context is significant). The "C" bit specifies that the ordering and sizing of the contexts is predetermined. A "C" bit equal to zero indicates that no contexts are in use and that they can be ignored. If a context header is not in use, the value of that context header is zero.

The protocol type field of the base header 105 indicates the protocol type of the original packet or frame. The service index field specifies time-to-live (TTL) functionality and location within the service path. The service index is decremented by service nodes after performing required service function(s). The service path identifier field identifies a particular service path. A service node uses this identifier for path selection.

The combination of the service path identifier and service index carried within the NSH 100 is used for identification of which specific service functions should be applied to packets. Each service path identifier is a unique value that points to an ordered list of service functions and the service index is decremented by 1 at each service hop so that a service node receiving a packet prefaced with a NSH is able to identify which of the ordered list of service functions it should apply.

The context headers 110(1)-110(N) carry opaque metadata. For example, one of the context headers may be a network platform context that provides platform-specific metadata shared between network nodes, while another context header is a network shared context that provides metadata relevant to any network node, such as the result of edge classification. Another context header may be a service platform context that provides service platform specific metadata shared between service functions, while a still other context header is a service shared context that provides metadata relevant to, and shared, between service functions. Thus, each context header carries service related information of a different scope that is relevant to one or more service functions in the service path.

Variable Set of Context Headers

The context headers 110(1)-110(N) are used to provide platform or service specific metadata that is shared between network nodes. These context headers may be fixed in number and the optional nature of contexts is only in the form of invalid NULL values.

The context headers serve several purposes. For example, they pass metadata to the service nodes for interpretation and for deriving service policy/profiles necessary to deliver services corresponding to the service path. In other words, each context header may be interpreted to derive a service profile used for applying a service at the network node in the service path. In addition, the context headers pass forwarding state to the intermediate network nodes as well as service-functions that participate in realizing the service chain. The context headers may be defined and predetermined by the controller (e.g., controller 20 as shown in FIG. 1) that is in communication with the plurality of service nodes or they may be determined and agree upon, a priori, among the service nodes. In the latter case, each of the plurality of network service stores information indicating the structure and definitions on which the variable set of context headers are based.

The metadata passed in the context headers is specific to the forwarding state carried and in that sense, different forwarding paths might carry different metadata. The controller is responsible for managing and pushing service chains to the network nodes that act as classifiers. The service chains and the forwarding path used to realize the service chains determine the service forwarding path or service-path. The service-path thus becomes the forwarding state that all network nodes have to extract from the context stack in determining the next-hop of the service chain. The network nodes can utilize this forwarding state not only to determine the next-hop for the service chain but also to perform additional transformations on the traffic in accordance with metadata for a particular context header in order to support a variety of service instances, i.e., in order to support a particular service function. As an example, the network nodes can replace the incoming transport with a completely different one that is understood by the service while preserving the context stack. The context headers also enable network nodes to act as proxies to the service functions of another network node and perform mapping of metadata to primitive interfaces understood by the services. Thus, when a network node receives a service header, parses the service header to retrieve the one or more stacked context headers, the network node interprets a forwarding state and a next-hop network node for the service path from the service header, and determines a service action or associated metadata from the set of context headers.

Once the metadata is added to a packet, the outer encapsulation TH 150 is used to forward the original packet and the associated metadata to the start of a service chain. The NSH 100 is independent of the TH 150 encapsulation used and may be encapsulated using any transport scheme now known or hereinafter developed. The presence of the NSH 100 is indicated via protocol type in the outer encapsulation or, in the case of Multi-Protocol Label Switching (MPLS), the presence of the Generic Associate Channel G-Ach Label (GAL).

Service nodes may comprise service-functions that are able to process (i.e., understand and interpret) the NSH 100, as well as services that are unable to process service headers. Service-functions that are able to process service headers are referred to as "participant" service-functions, while service-functions that are unable to process service headers are referred to as "non-participant" service-functions. When a participant service-function (i.e. a service that understands and interprets the service header) receives a packet and associated service header, the service uses the metadata for local policy enforcement. For example, the metadata might indicate the type of application being carried, and a firewall can use that metadata to permit/deny that application without having to classify the packets.

When a service-function is not service header aware (i.e., a non-participant service-function), a service proxy may be used to enable the non-participant service-function to join the service chain. The service proxy is configured to remove the service header and forward the traffic to a connected non-participant service-function. In traditional arrangements, there is a static one-to-one mapping between a service proxy and a single connected non-participant service-function (i.e., an inbound service path-ID points to an outbound local identifier such as a VLAN).

In the example of FIG. 1, service-functions 60(1)-60(N) are non-participant service-functions, while service-functions 65(1)-65(N), 70(1)-70(N), and 75(1)-75(N) are participant service-functions. As such, the service node 40 includes a configurable service proxy 120. In accordance with the techniques presented herein, the configurable service proxy 120 is arranged to forward data in received packet 90 to one of the plurality of connected service-functions 60(1)-60(N). More specifically, the configurable service proxy 120 is arranged to use the NSH metadata in the received packet 90 to map the data in the packet to a local identifier that is associated with one of the plurality of connected service-functions 60(1)-60(N). The configurable service proxy 120 is further arranged to forward the data to the service-function associated with the local identifier. The local identifier may be, for example, a connected VLAN, Internet Protocol (IP) Tunnel, etc.

The service proxy 120 is "configurable" in that a network administrator or other user can select specific metadata, or combinations of metadata in the NSH, that are used by the service proxy 120 to map to local identifiers. Additionally, the network administrator can set the policies that are enforced by the service proxy 120 (i.e., the appropriate action by the service policy in response to received metadata and/or combinations of metadata). As such, the techniques presented herein provide granularity in terms of policy placement of traffic based on the service header.

Figure 2A:
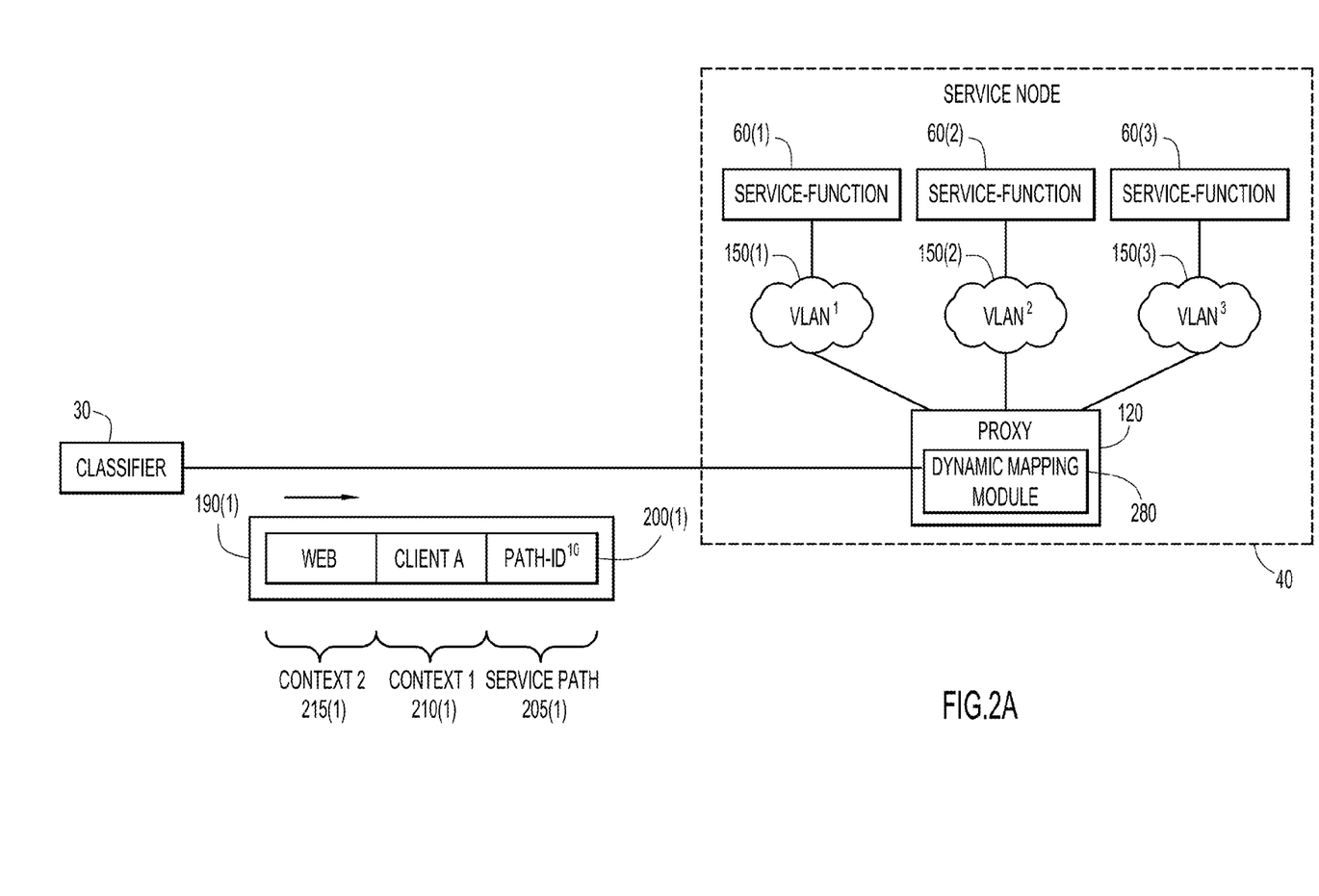
FIGS. 2A-2C are schematic diagrams illustrating the operation of a configurable service proxy in accordance with examples presented herein.
Figure 2B:
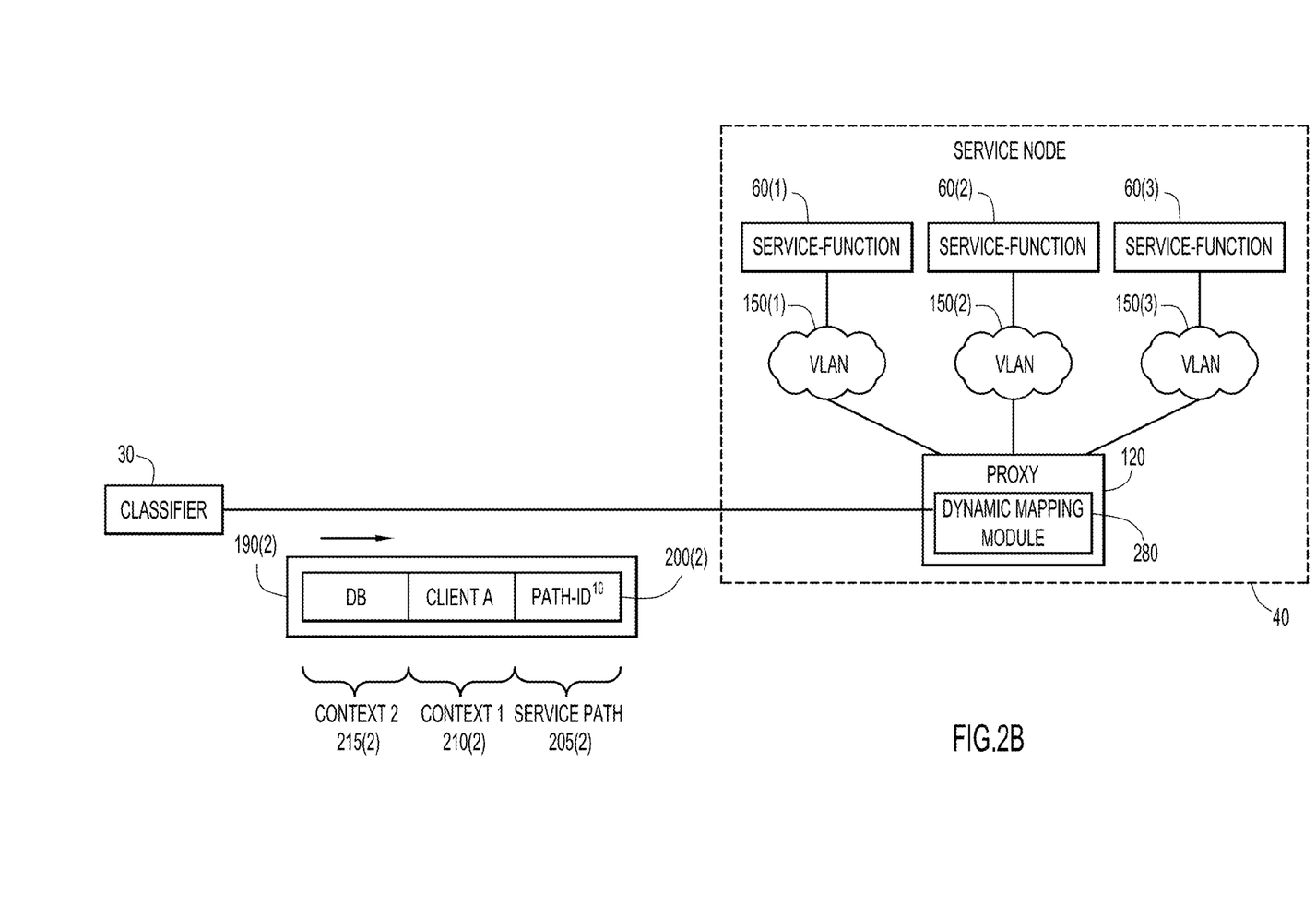
Figure 2C:
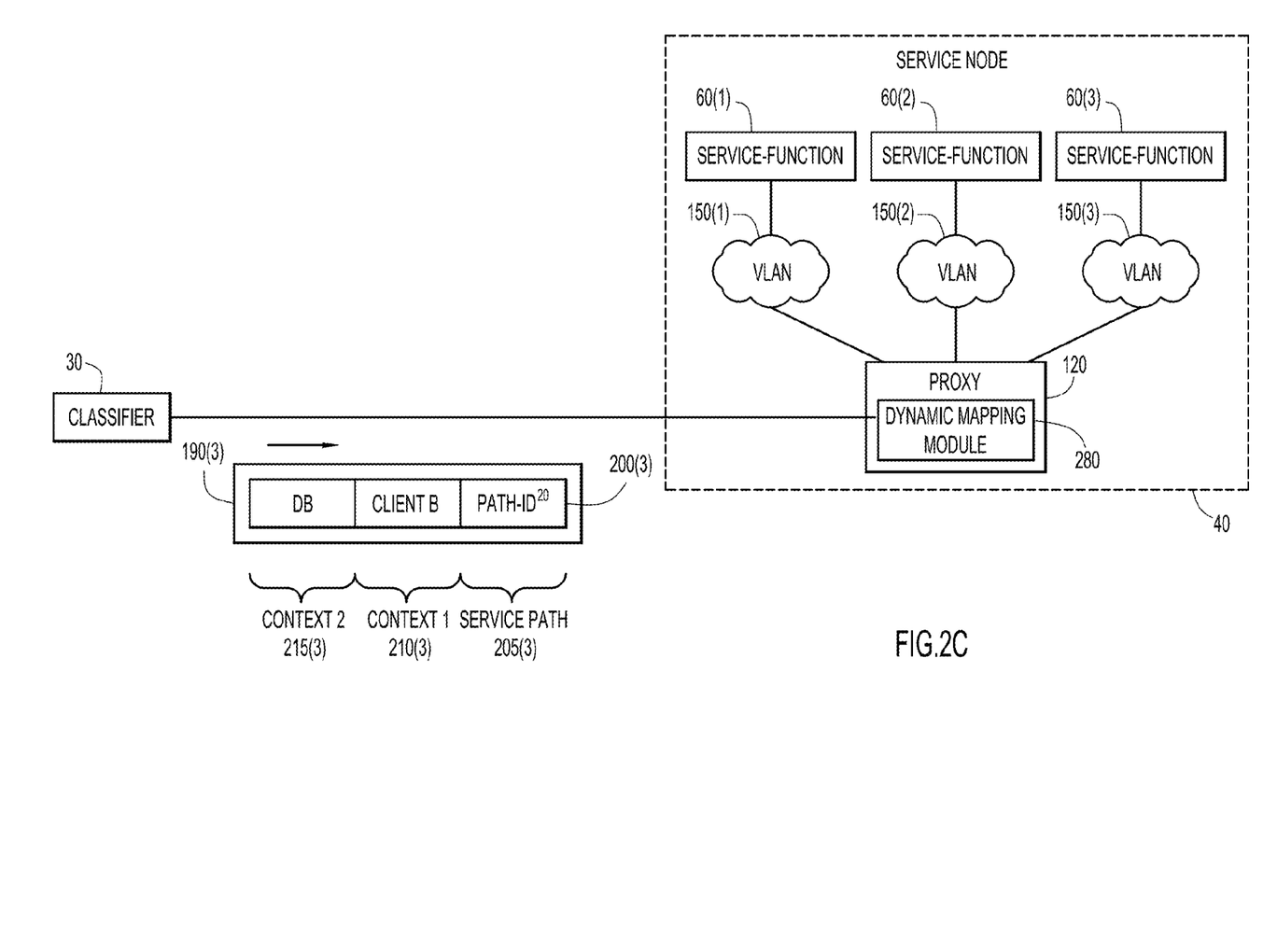

FIGS. 2A-2C are schematic diagrams illustrating the operation of configurable service proxy 120 in service node 40 to forward traffic to one of a plurality of service-functions using NSH metadata. In the specific example of FIGS. 2A-2C, the service node 40 supports three services-functions 60(1), 60(2), and 60(3). Service-function 60(1) is a web service-function, while service-functions 60(2) and 60(3) are different instances of a database service-function. The services-functions 60(1), 60(2), and 60(3) are connected to configurable service proxy 120 via separate VLANs, referred to as $VLAN^1$ 150(1), $VLAN^2$ 150(2), and $VLAN^3$ 150(3), respectively. Configurable service proxy 120 may comprise, for example, a switch, router, etc.

As shown in FIG. 2A, configurable service proxy 120 receives a packet 190(1) from classifier 30 that includes an NSH 200(1). The NSH 200(1) includes a path identifier (ID) 205(1) that identifies the service path for the packet 190(1) as path-$ID^{10}$. The NSH 200(1) also comprises a first context (context 1) 210(1) and a second context (context 2) 215(1). In the example of FIG. 2A, the first context 210(1) is a client identifier (ID) that indicates that the client associated with the packet 190(1) is Client A. Additionally, the second context 215(1) is an application identifier (ID) that indicates that the application associated with the packet 190(1) is a web application.

The configurable service proxy 120 includes a dynamic mapping module 280 that is configured to evaluate the service path 205(1) and the metadata (i.e., one or both of the contexts 210(1) and 215(1)) to forward the data in packet 190(1) to one of the service functions 60(1), 60(2), or 60(3). The dynamic mapping module 280 may evaluate the service path and metadata in accordance with, or based on, one or more predetermined or pre-programmed policies.

In the example of FIG. 2A, the dynamic mapping module 280 determines that the packet 190(1) is associated with the service path of path-ID$^{10}$, determines that client associated with the packet 190(1) is Client A, and determines that a web application is associated with the packet 190(1).

Figure 3:
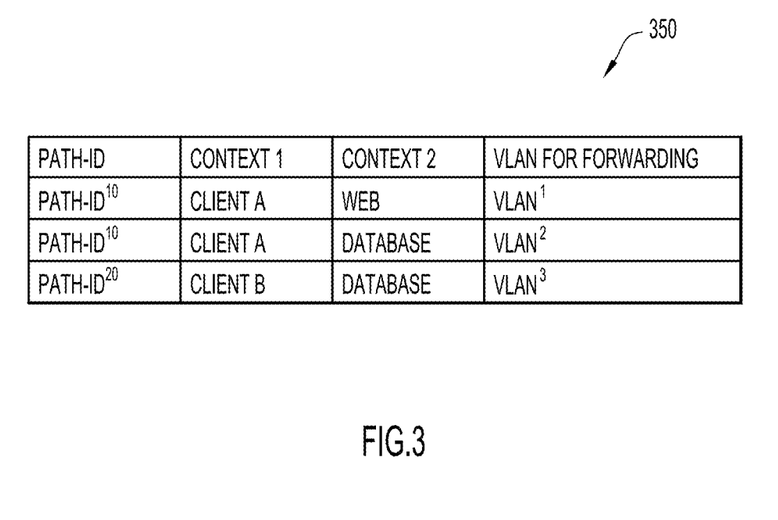
FIG. 3 is an example mapping table in accordance with the techniques presented herein.

FIG. 3 shows a table 350 that schematically illustrates policies that have been set by a network administrator for enforcement by configurable service proxy 120. More specifically, in the example of FIG. 2A, the dynamic mapping module 280 is pre-programmed with a policy such that the combination of path-ID$^{10}$, Client A, and the web application causes the data in packet 190(1) to be mapped to VLAN$^1$ 150(1) and forwarded to web service-function 60(1) connected to that VLAN. As noted above, the configurable service proxy 120 is present because the service-functions 60(1), 60(2), or 60(3) are non-participant service-functions. That is, the service-functions 60(1), 60(2), or 60(3) are unable to process the NSH 200(1). As such, the configurable service proxy 120 removes the NSH 200(1) and sends the data (traffic) across VLAN$^1$ 150(1) to web service-function 60(1).

Referring back to FIG. 2B, this figure illustrates another example in which the configurable service proxy 120 receives a packet 190(2) from classifier 30 that includes an NSH 200(2). The NSH 200(2) includes a path ID 205(2) that identifies the service path for the packet 190(2) as path-ID$^{10}$. The NSH 200(2) also comprises a first context (context 1) 210(2) and a second context (context 2) 215(2). In the example of FIG. 2B, the first context 210(2) is a client ID that indicates that the client associated with the packet 190(2) is Client A. Additionally, the second context 215(2) is an application ID that indicates that the application associated with the packet 190(2) is a database (DB) application.

As noted above, the dynamic mapping module 280 of configurable service proxy 120 is configured to evaluate the service path 205(2) and the metadata (i.e., one or both of the contexts 210(2) and 215(2)) (based on one or more pre-determined or pre-programmed policies) to forward the data in packet 190(2) to one of the service functions 60(1), 60(2), or 60(3). In the example of FIG. 2B, the dynamic mapping module 280 determines that the packet 190(2) is associated with the service path of path-ID$^{10}$, determines that the client associated with the packet 190(1) is Client A, and determines that a database application is associated with the packet 190 (2). As shown in the table 350 of FIG. 3, the dynamic mapping module 280 is pre-programmed with a policy such that the combination of path-ID$^{10}$, Client A, and the database application causes the data in packet 190(2) to be mapped to VLAN$^2$ 150(2) and forwarded to database service-function 60(2) connected to that VLAN.

As noted above, the configurable service proxy 120 is present because the service-functions 60(1), 60(2), or 60(3) are non-participant service-functions. As such, the configurable service proxy 120 removes the NSH 200(2) and sends the data (traffic) across VLAN$^2$ 150(2) to database service-function 60(2).

FIG. 2C illustrates another example in which the configurable service proxy 120 receives a packet 190(3) from classifier 30 that includes an NSH 200(3). The NSH 200(3) includes a path ID 205(3) that identifies the service path for the packet 190(3) as path-ID$^{20}$. As such, the service path for packet 190(3) is different from the service path for packets 190(1) and 190(2) shown in FIGS. 2A and 2B, respectively.

The NSH 200(3) also comprises a first context (context 1) 210(3) and a second context (context 2) 215(3). In the example of FIG. 2C, the first context 210(3) is a client ID that indicates that the client associated with the packet 190(3) is Client B (i.e., a different client than in FIGS. 2A and 2B). Additionally, the second context 215(3) is an application ID that indicates that the application associated with the packet 190(3) is a database application.

As noted above, the dynamic mapping module 280 of configurable service proxy 120 is configured to evaluate the service path 205(3) and the metadata (i.e., one or both of the contexts 210(3) and 215(3)) using one or more pre-determined or pre-programmed policies to forward the data in packet 190(3) to one of the service-functions 60(1), 60(2), or 60(3). In the example of FIG. 2C, the dynamic mapping module 280 determines that the packet 190(2) is associated with the service path of path-ID$^{20}$, determines that client associated with the packet 190(2) is Client B, and determines that a database application is associated with the packet 190 (3). As shown in the table 350 of FIG. 3, the dynamic mapping module 280 is pre-programmed with a policy such that the combination of path-ID$^{20}$, Client B, and the database application causes the data in packet 190(3) to be mapped to VLAN$^3$ 150(3) and forwarded to database service-function 60(3) connected to that VLAN.

As noted above, the configurable service proxy 120 is present because the service-functions 60(1), 60(2), or 60(3) are non-participant service-functions. As such, the configurable service proxy 120 removes the NSH 200(3) and sends the data (traffic) across VLAN$^3$ 150(3) to database service-function 60(3).

In accordance with the techniques of FIGS. 2A-2C, the configurable service proxy 120 is enabled with an interface that enables a network administrator or other user to select metadata, or a combination of metadata, to be used during the mapping of traffic to one of a plurality of service functions. The dynamic proxy mapping function presented herein provides a network administrator with the ability to select which metadata fields are relevant, and which of those fields should be combined to create a local identifier (i.e., to identify a destination to forward packet data). In general, the network administrator can designate which (any, all, or none) of the metadata fields (i.e., context headers) are to be used to determine the local identifier.

In the examples of FIGS. 2A-2C, the service path and two context headers are used to determine the local identifier. It is to be appreciated that the use of other combinations and numbers of context headers or service header metadata, in general, may be used in other examples.

Figure 4:
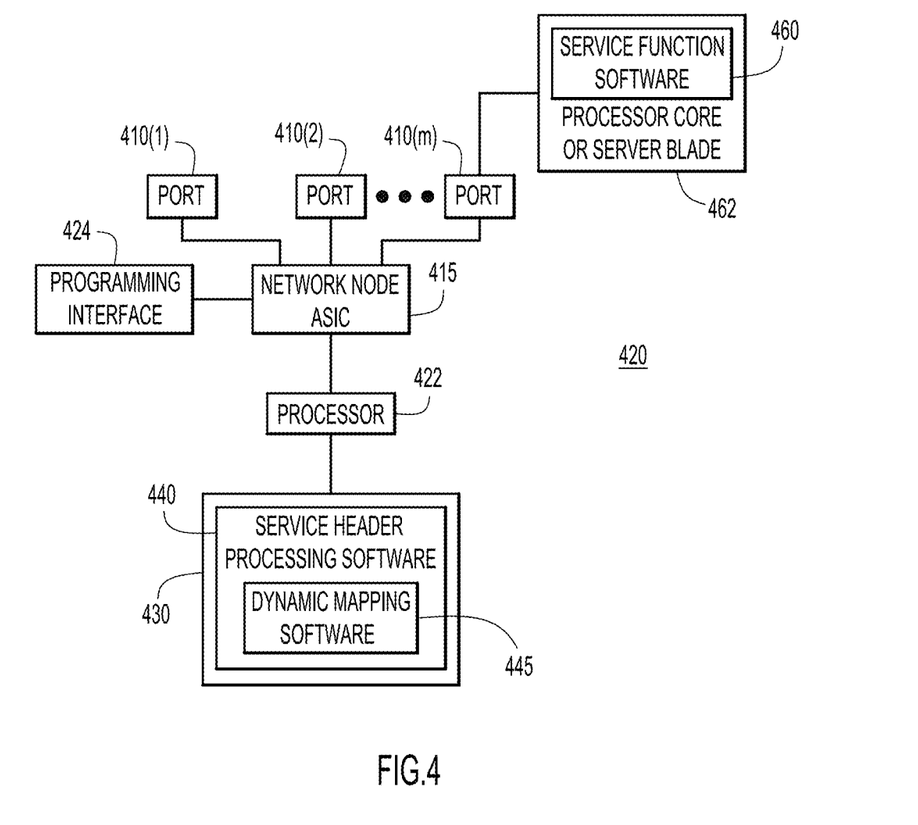
FIG. 4 is a block diagram of a configurable service proxy in accordance with examples presented herein.

FIG. 4 illustrates an example block diagram for a configurable service proxy 420, e.g., a switch, router, gateway, etc., configured to perform the operations described herein. It should be understood that a virtual network node would be a software-emulated or virtualized version of what is shown in FIG. 4. The configurable service proxy 420 comprises a plurality of ports 410(1)-410(m), a programming interface 424, a network Application Specific Integrated Circuit (ASIC) 415, a processor or central processing unit (CPU) 422 and memory 430. The ports 410(1)-410(m) receive ingress packets and output egress packets from the network node. In certain examples, one or more of the ports 410(1)-410(m) are connected to VLANs for forwarding packet data to service-functions.

The network node ASIC 415 directs incoming packets to ports for egress according to logic as well as controls from the processor 422. For example, if the network node is a router, then the ASIC 415 is a router ASIC configured for network routing functions, and if the network node is a switch, then the ASIC 415 is a switch ASIC configured for network switch functions. The processor 422 is a microprocessor or microcontroller, for example, and executes instructions for the service header processing firmware/software 440 stored in memory 440. As shown, the service header processing firmware/software 440 includes dynamic mapping firmware/software 445. The service header processing firmware/software 440, and more particularly dynamic mapping firmware/software 445, includes instructions that, when executed by the processor 422, cause the processor to perform the operations described herein in connection with FIGS. 1-3 for a configurable service proxy.

The operations of a service-function associated with configurable service proxy 420 are implemented by service-function software 460 running on a processor core or server blade 462 that is in communication with a port, e.g., port 410(m), of the network node.

The memory 430 may comprise read only memory (ROM), random access memory (RAM), magnetic disk storage media devices, optical storage media devices, flash memory devices, electrical, optical, or other physical/tangible memory storage devices. In general, the memory 430 may comprise one or more tangible (non-transitory) computer readable storage media (e.g., a memory device) encoded with software comprising computer executable instructions and when the software is executed (by the processor 422) it is operable to perform the operations described herein.

As noted, the configurable service proxy 420 also comprises a programming interface 424. The programming interface 424 is arranged to enable a network administrator other user to select the service header metadata, or combinations of metadata, that are used by the configurable service proxy 220 to map data to local identifiers. In other words, the network administrator can use the programming interface 424 to set the policies that are enforced by the service proxy 120 (i.e., the appropriate action by the service policy in response to received metadata and/or combinations of metadata). The programming interface 424 may be, for example, is a port or input for connection to another device (e.g., computer), a command-line-interface (CLI), etc.

Figure 5:
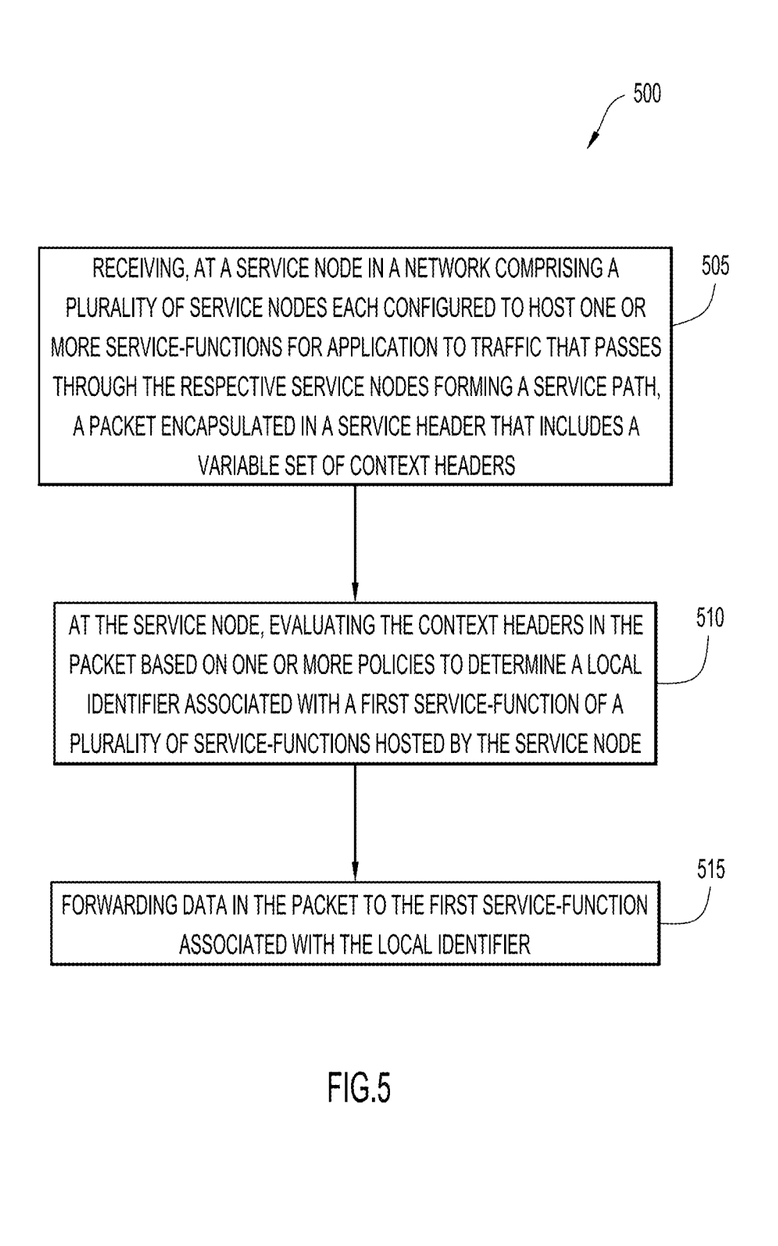
FIG. 5 is a flowchart of a process in accordance with examples presented herein.

FIG. 5 illustrates a flow chart that depicts the operations of a process 500 performed in a service proxy when receiving packets that are encapsulated in a service header (e.g., NSH). As depicted above in FIG. 1, these operations are performed by a service proxy in a service node that is part of a network that comprises a plurality of service nodes, each configured to host one or more service-functions that operate on traffic (packet data) that passes through the respective service nodes. At 505, the service proxy in the service node receives a packet encapsulated in a service header that includes a variable set of context headers. At 510, the context headers in the packet are evaluated based on one or more policies to determine a local identifier associated with a first service-function of a plurality of service-functions hosted by the service node. At 515, data in the packet is forwarded to the first service-function associated with the local identifier.

In summary, techniques are presented herein enable a network administrator or other user select what metadata field(s) are used for policy enforcement (by a service) in a service chaining environment when a service header is used, but the service does not support such a header. The techniques allow for a more flexible service chain where all services benefit from metadata, create a migration path for header awareness on services, create increased network node value (i.e., the service node performs an important mapping function), and simplifies orchestration such that policies can be based on metadata.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method performed in a network comprising a plurality of service nodes each configured to host one or more service-functions for application to traffic that passes through the respective service nodes forming a service path, the method comprising:
   receiving, at a service node hosting a configurable service proxy and a plurality of non-participant service functions, a packet encapsulated in a service header that includes a variable set of context headers, wherein the plurality of non-participant service functions are service functions that are unable or not configured to process the service header;
   at the configurable service proxy in the service node, removing the service header from the packet to form a non-encapsulated packet;
   evaluating, at the configurable service proxy, the context headers based on one or more policies to map data in the packet to a local identifier associated with a first non-participant service-function of the plurality of non-participant service-functions hosted within the service node; and
   forwarding, by the configurable service proxy, the data in the packet to the first non-participant service-function that is hosted within the service node and that is associated with the local identifier.

2. The method of claim 1, further comprising:
   receiving, at the service node, an identification of which context headers in the received packet are to be evaluated for mapping the data in the packet to a local identifier.

3. The method of claim 1, further comprising:
   receiving, at the service node, an identification of the one or more policies for use in evaluating the context headers for mapping the data in the packet to a local identifier.

4. The method of claim 1, wherein removing the service header from the packet comprises:
   prior to forwarding the data in the packet to the first non-participant service-function associated with the local identifier, removing the context headers from the data.

5. The method of claim 1, where evaluating the context headers in the packet based on one or more policies to determine a local identifier comprises:
   determining a virtual local area networks (VLAN) associated with the first non-participant service-function.

6. The method of claim 1, further comprising:
   receiving, at the configurable service proxy, modified data from the first non-participant service-function associated with the local identifier;
   encapsulating the modified data with the service header; and
   determining, at the configurable service proxy based on the set of context headers, how to forward the packet.

7. The method of claim 1, wherein each context header carries service related information of a different scope that is relevant to one or more non-participant service-functions in the service path.

8. The method of claim 1, further comprising generating the service header that includes the variable set of context headers, at a controller that is in communication with the plurality of service nodes.

9. An apparatus in a network comprising a plurality of service nodes each configured to host one or more service-functions for application to traffic that passes through the respective service nodes forming a service path, wherein the apparatus hosts a plurality of non-participant service functions, wherein the plurality of non-participant service functions are service functions that are unable or not configured to process the service header, the apparatus comprising:
a network interface configured to receive a packet encapsulated in a service header that includes a variable set of context headers;
a memory; and
a processor configured to:
execute a configurable service proxy function to remove the service header from the packet to form a non-encapsulated packet;
execute the configurable service proxy function to evaluate the context headers based on one or more policies to map data in the packet to a local identifier associated with a first non-participant service-function of the plurality of non-participant service-functions hosted within the service node, and
forward the data in the packet to the first non-participant service-function that is hosted within the service node and that is associated with the local identifier.

10. The apparatus of claim 9, wherein the processor is configured to:
receive an identification of which context headers in the received packet are to be evaluated for mapping the data in the packet to a local identifier.

11. The apparatus of claim 9, wherein the processor is configured to:
receive an identification of the one or more policies for use in evaluating the context headers for mapping the data in the packet to a local identifier.

12. The apparatus of claim 9, wherein to remove the service header from the packet, the processor is configured to:
prior to forwarding the data in the packet to the first non-participant service-function associated with the local identifier, remove the context headers from the data.

13. The apparatus of claim 9, where to evaluate the context headers in the packet based on one or more policies to determine a local identifier, the processor is configured to:
determine a virtual local area networks (VLAN) associated with the first non-participant service-function.

14. The apparatus of claim 9, wherein the processor is configured to:
receive modified data from the first non-participant service-function associated with the local identifier;
encapsulate the modified data with the service header; and
determine, based on the set of context headers, how to forward the packet.

15. The apparatus of claim 9, wherein each context header carries service related information of a different scope that is relevant to one or more non-participant service-functions in the service path.

16. One or more non-transitory computer readable storage media encoded with software comprising computer executable instructions executed at a service node in a network comprising a plurality of service nodes each configured to host one or more service-functions for application to traffic that passes through the respective service nodes forming a service path, wherein when executed the software is operable to:
receive, at a service node hosting a configurable service proxy and a plurality of service functions, a packet encapsulated in a service header that includes a variable set of context headers, wherein the plurality of non-participant service functions are service functions that are unable or not configured to process the service header;
at the configurable service proxy in the service node, remove the service header from the packet to form a non-encapsulated packet;
evaluate, at the configurable service proxy, the context headers in the packet based on one or more policies to map data in the packet to a local identifier associated with a first non-participant service-function of the plurality of non-participant service-functions hosted within the service node; and
forward, by the configurable service proxy, the data in the packet to the first non-participant service-function that is hosted within the service node and that is associated with the local identifier.

17. The non-transitory computer readable storage media of claim 16, further comprising instructions operable to:
receive, at the service node, an identification of which context headers in the received packet are to be evaluated for mapping the data in the packet to a local identifier.

18. The non-transitory computer readable storage media of claim 16, further comprising instructions operable to:
receive, at the service node, an identification of the one or more policies for use in evaluating the context headers for mapping the data in the packet to a local identifier.

19. The non-transitory computer readable storage media of claim 16, wherein the instructions operable to remove the service header from the packet comprise instructions operable to:
prior to forwarding the data in the packet to the first non-participant service-function associated with the local identifier, remove the context headers from the data.

20. The non-transitory computer readable storage media of claim 16, where the instructions operable to evaluate the context headers in the packet based on one or more policies to determine a local identifier comprise instructions operable to:
determine a virtual local area networks (VLAN) associated with the first non-participant service-function.

21. The non-transitory computer readable storage media of claim 16, further comprising instructions operable to:
receive, at the configurable service proxy, modified data from the first non-participant service-function associated with the local identifier;
encapsulate the modified data with the service header; and
determine, at the configurable service proxy based on the set of context headers, how to forward the packet.

22. The non-transitory computer readable storage media of claim 16, wherein each context header carries service related information of a different scope that is relevant to one or more non-participant service-functions in the service path.

* * * * *